(12) United States Patent  (10) Patent No.: US 11,464,686 B2
Muin et al.  (45) Date of Patent: Oct. 11, 2022

(54) MOBILE APPARATUS WITH AN INTEGRATED STRETCHER APPARATUS FOR PATIENTS

(71) Applicant: Airbus Operations GmbH, Hamburg (DE)

(72) Inventors: Andrew Muin, Hamburg (DE); Hendrik Segelhorst, Hamburg (DE)

(73) Assignee: Airbus Operations GmbH

( * ) Notice: Subject to any disclaimer, the term of this patent is extended or adjusted under 35 U.S.C. 154(b) by 0 days.

(21) Appl. No.: 17/336,601

(22) Filed: Jun. 2, 2021

(65) Prior Publication Data

US 2021/0378889 A1  Dec. 9, 2021

(30) Foreign Application Priority Data

Jun. 5, 2020 (DE) .................... 10 2020 114 943.3

(51) Int. Cl.
*A61G 1/06* (2006.01)
*A47B 31/06* (2006.01)
(Continued)

(52) U.S. Cl.
CPC ............. *A61G 1/06* (2013.01); *A47B 31/06* (2013.01); *A61G 1/013* (2013.01); *A47B 2031/006* (2013.01)

(58) Field of Classification Search
CPC ... A61G 1/04; A61G 1/06; A61G 1/00; A61G 1/013; A47B 31/06; A47B 2031/006; A47B 31/04
See application file for complete search history.

(56) References Cited

U.S. PATENT DOCUMENTS 4,790,610 A * 12/1988 Welch .................... A61B 50/10
D24/185
5,765,842 A * 6/1998 Phaneuf .................. B62B 3/001
280/47.35
(Continued)

FOREIGN PATENT DOCUMENTS

CN 2254677 Y 5/1997
CN 110882120 A 3/2020
(Continued)

OTHER PUBLICATIONS

Extended European Search Report for Application No. Ep 21175130, dated Oct. 11, 2021, 9 pages (p. 2 categorizing cited references).
(Continued)

*Primary Examiner* — Fredrick C Conley
(74) *Attorney, Agent, or Firm* — Lerner, David, Littenberg, Krumholz & Mentlik, LLP

(57) ABSTRACT

A mobile apparatus with an integrated stretcher apparatus for patients has a base having rotatably mounted wheels on a bottom side for moving the base on the ground, a frame which is fastened to a top side of the base and which is open at least on one side, and a stretcher apparatus having segments which are mounted pivotably relative to one another, wherein the segments are configured for folding the stretcher apparatus into a first form, in which all the segments adjoin one another in a plane, and for folding said stretcher apparatus into a second form, in which the stretcher apparatus is packed down, and wherein the stretcher apparatus and the frame are configured to be complementary to one another such that the stretcher apparatus in the second form can be completely introduced into the frame.

15 Claims, 4 Drawing Sheets

(51) Int. Cl.
    *A61G 1/013*     (2006.01)
    *A47B 31/00*     (2006.01)

(56) References Cited

U.S. PATENT DOCUMENTS

| | | |
|---|---|---|
| 6,273,366 B1 | 8/2001 | Sprenger et al. |
| 2006/0060704 A1 | 3/2006 | Lavie et al. |
| 2007/0056106 A1* | 3/2007 | Roberts ................ A61G 1/0293 5/617 |
| 2009/0144903 A1 | 6/2009 | Delvaux et al. |

FOREIGN PATENT DOCUMENTS

| | | |
|---|---|---|
| DE | 4112270 C1 | 7/1992 |
| DE | 19650584 A1 | 6/1998 |
| DE | 202014003098 U1 | 6/2014 |
| EP | 2817221 A1 | 12/2014 |
| WO | 2009061662 A1 | 5/2009 |

OTHER PUBLICATIONS

German Search Report for Application No. 102020114943.3, dated Mar. 30, 2021, 10 pages (p. 2 categorizing the cited art).

* cited by examiner

MOBILE APPARATUS WITH AN INTEGRATED STRETCHER APPARATUS FOR PATIENTS

FIELD OF THE INVENTION

The invention relates to a mobile apparatus with an integrated stretcher apparatus for patients. The invention also relates to a system for transporting patients in a lying position in a means of transportation.

BACKGROUND OF THE INVENTION

For the transport of patients in a means of transportation, for example a commercial aircraft, use is usually made of stretchers which are arranged in the means of transportation on a row of passenger seats, which are then blocked for the normal transport of passengers. For transport, patients are often carried from outside into the means of transportation on a stretcher, and the stretcher is secured for the journey. Due to the size of such a stretcher, stretchers are not usually carried on board the means of transportation, and therefore people who become ill during the journey cannot be immediately laid on a stretcher.

EP2817221A1 discloses a toilet arrangement for a cabin of a commercial aircraft, said toilet arrangement having a housing which in one region has a pivotable flap ("stretcher flap") that makes it easier to manoeuvre a stretcher inside the cabin, in particular directly in front of a door region.

BRIEF SUMMARY OF THE INVENTION

An aspect of the invention relates to an apparatus which makes it possible for patients to be placed, as required, on a stretcher during the journey in a means of transportation, the intention being to block as little installation space as possible inside the cabin.

A mobile apparatus with an integrated stretcher apparatus for patients is proposed, comprising a base having rotatably mounted wheels on a bottom side for moving the base on the ground, a frame which is fastened to a top side of the base and which is open at least on one side, and a stretcher apparatus having segments which are mounted pivotably relative to one another, wherein the segments are configured for folding the stretcher apparatus into a first form, in which all the segments adjoin one another in a plane, and for folding said stretcher apparatus into a second form, in which the stretcher apparatus is packed down, and wherein the stretcher apparatus and the frame are configured to be complementary to one another such that the stretcher apparatus in the second form can be largely completely introduced into the frame.

The apparatus according to an embodiment of the invention permits transport, as required, of patients in a means of transportation, in that a compact, mobile unit is provided which accommodates a packed-down stretcher apparatus. For this purpose, provision is made for the mobile apparatus to have wheels on a bottom side of its base, said wheels being used to move the apparatus on the ground. This permits a user to store the mobile apparatus at a location suitable therefor inside a passenger cabin of the means of transportation in question and to take it to an ill person merely as required. The design of the stretcher apparatus with a plurality of segments which are arranged so as to be pivotable relative to one another makes it possible to pack down a large-size stretcher by folding together the individual segments. The segments are preferably composed of a rigid, panel-like material. The segments can each have a hinge apparatus at their boundary edges which point towards the respectively other segments, said hinge apparatus being connected to a hinge apparatus of the adjoining segment to form a hinge. The hinges could be configured in such a way that they can be pivoted merely in a range from 0-180° and enforce a rigid limitation of the pivot angle at 180°. It could thus for example be sufficient to fold the segments apart such that their consecutive order forms a planar surface. As a result of the limitation of the pivot angle, this planar form remains unchanged even under load. However, also conceivable are mechanisms which comprise for example locking elements that latch into one another when the segments are being folded apart and that have to be manually released again in order to pack down the stretcher.

The frame of the apparatus is intended to predefine an outer form of the apparatus and to enable positionally fixed mounting of the stretcher apparatus on the base. The frame makes it possible for a receiving space inside the cabin to be restricted to the smallest possible size for the intended purpose. The stretcher apparatus is, however, adapted to the installation space predefined by the frame by means of the design of the foldable segments. It is advisable to design the segments in such a way that the width of the stretcher apparatus, which corresponds to a short side of the stretcher apparatus, correlates with the height of the frame. Consequently, the folded-together segments are introduced into the frame preferably in an upright manner. The total area of the transport apparatus is reduced as a result of the folding-together of the segments, and therefore the segments can be introduced in a depthwise and widthwise extent of the frame.

The frame could also have different elements defining the outer form of the frame. The frame could have a frame structure with a plurality of bars which define for example a substantially cuboidal space. To this end, as an alternative or in addition, individual walls which define at least a part of the form are also conceivable.

It could also be expedient for the segments to be designed in such a way that they form a part of the outer surface of the frame when positioned in the frame, such that the mobile apparatus, with the transport apparatus located therein, forms a completely closed unit. In this way, said mobile apparatus can be readily inserted into a receiving space, is protected against soiling and also has a comparatively low weight.

In order to move the apparatus, it is expedient for at least one handle to be arranged on the frame. Furthermore, it could be expedient for at least one of the wheels to be able to be blocked as required, in order to prevent an unintentional movement of the apparatus inside the means of transportation. However, instead of a handle, a control unit which actuates a drive apparatus could also be provided.

In one advantageous embodiment, the frame could have two walls, which project from the base and define an intermediate space into which the stretcher apparatus can be inserted in the second form. The two walls do not necessarily have to extend over the entire width and/or over the entire depth of the frame. Rather, they may cover merely a part of a side or end surface and receive the stretcher apparatus in the first form. In this case, a wall could be a two-dimensional element which has at least a largely or predominantly closed surface. Depending on the intended point of use of the mobile apparatus, a wall composed of a lightweight material, for example a honeycomb material, could be appropriate.

In one advantageous embodiment, the stretcher apparatus has at least one first segment and at least two second segments, which follow one another in an alternating manner, wherein the second segment has a larger area than the first segment. The second segments could be dimensioned in such a way that they can be introduced along a depthwise extent of the frame, while the first segments are provided for a widthwise extent. In this case, provision is made for the depth of the frame to exceed the width to a considerable extent.

It is advantageous for the area of the second segment to be at least twice as large as the area of the first segment. The stretcher apparatus could then be designed such that the second segments run back and forth in the depth direction of the frame and the first segments traverse the space in the width direction of the frame. The second segments could be laid flush with one another, wherein the first segments then run between end-side edges of the second segments. As an alternative thereto, the stretcher apparatus could also be folded such that, in a folded-together state, a cavity is formed between the segments, and sometimes the stretcher apparatus itself forms the wall of the frame.

In one advantageous embodiment, the frame has a cover element which is spaced apart from the base, wherein the stretcher apparatus can be introduced between the cover element and the base. The cover element closes off the frame towards the top and can provide the frame with additional stiffness. It is then also conceivable for other articles to be placed on the apparatus according to the invention, without the removal of the stretcher apparatus being obstructed. In addition, the cover element could be configured to receive handles and the like, such that the apparatus can be handled more easily.

It is particularly advantageous for the cover element to have a recess for receiving an emergency kit. The emergency kit could accommodate various pieces of medical equipment, for example materials and medication for first-aid treatment of a patient. By being arranged in the cover element, the emergency kit is easily reachable regardless of the current form of the stretcher apparatus. A striking colouring also makes said emergency kit visually stand out to a pronounced extent, such that a user of the apparatus according to the invention is immediately made aware of the emergency kit.

In a further advantageous embodiment, at least one of the wheels could be coupled to a drive apparatus. The drive apparatus could be coupled to a control unit which is located on the frame and for example in the aforementioned cover element. The drive apparatus also makes it possible for relatively heavy apparatuses to easily be moved through the means of transportation. It is conceivable for the base to be of self-propelled design.

It is also advantageous for the outermost segments of the stretcher apparatus to each have a handle. In a particularly simple case, the handle could be implemented merely in the form of a cutout. The stretcher apparatus is then very easy to handle, and the patient can be carried by 2 people from the means of transport. It should be noted at this point that the stretcher apparatus ought to be designed such that it can be positioned on conventional transport frames, which are for example racks already outside the vehicle.

The stretcher apparatus could have a vacuum mattress on one side. The vacuum mattress could be filled with particles and air, wherein removal of the air by suction causes the particles to be fixed by an outer skin of the mattress, said outer skin pressing on the particles. As a result, patients can be transported in a predefined posture or position, which, for the passenger in question, is manually assumed by orientation of their body on the mattress and which is fixed by removal of the air by suction.

It is then preferable for the vacuum mattress to be arranged on the inside in the second form. This lends itself since the vacuum mattress is encapsulated as a result in the second form. It is particularly preferred for the segments to be configured such that they enclose a cavity in the second form, the vacuum mattress extending into the cavity.

It is particularly preferred for the apparatus, with the stretcher apparatus introduced in the frame, to have outer dimensions which correspond at most to those of a full-size cabin trolley for aircraft cabins. In this way, the apparatus according to the invention can be put into a trolley storage position in a cabin of a commercial aircraft in a simple manner Such trolley storage positions are usually provided as storage space for catering trolleys in galleys.

The invention also relates to a system for transporting patients in a lying position in a means of transportation, comprising at least one apparatus as explained above.

The system preferably also has a receiving apparatus for receiving the transport apparatus in the first form, wherein the receiving apparatus has a foldable bearing surface and a foldable covering which is configured to completely cover the stretcher apparatus. The receiving apparatus could be mounted inside a cabin and, as required, receive the stretcher apparatus in the first form, in which a patient is lying on it. When needed, the foldable bearing surface could be pivoted from a stowed position into a use position in order to receive the stretcher apparatus. As a result of the foldable covering, the person can be completely covered in order to give them privacy and discretion.

In a further advantageous embodiment of the system, the bearing surface has two flaps which are arranged so as to be pivotable relative to one another and which can be folded flush with one another and can be folded apart through 180°, and wherein the covering is coupled to the two flaps, such that said covering is folded out in the manner of a concertina during the folding-apart operation and is folded up during the folding-together operation. The combination of the two flaps and the foldable covering is consequently realized in a manner similar to a foldable paper lantern. If the two flaps are lying on one another, the bearing surface may be located in a wall in the interior of the cabin. As a result of the two flaps being pivoted open into a position in which the two flaps enclose an angle of 180° with respect to one another, it is consequently possible for the covering to be opened and to completely surround the bearing surface. It is preferable for the covering to be able to be opened at least on one side, in order for it to be possible to insert the stretcher apparatus.

Lastly, the receiving apparatus could be able to be integrated in a door or a wall of a monument in a cabin of a vehicle. The monument could accommodate for example an on-board toilet. In this way, a part of an interior space of an on-board toilet can preferably be utilized for receiving the stretcher device with a patient.

BRIEF DESCRIPTION OF THE DRAWINGS

Further features, advantages and possible uses of the present invention will emerge from the following description of the exemplary embodiments and from the figures. Here, all of the features described and/or illustrated in the figures form the subject matter of the invention individually and in any desired combination, even independently of the combination of said features in the individual claims or the back-references thereof. Furthermore, in the figures, the same reference signs are used for identical or similar objects.

DETAILED DESCRIPTION

Figure 1:
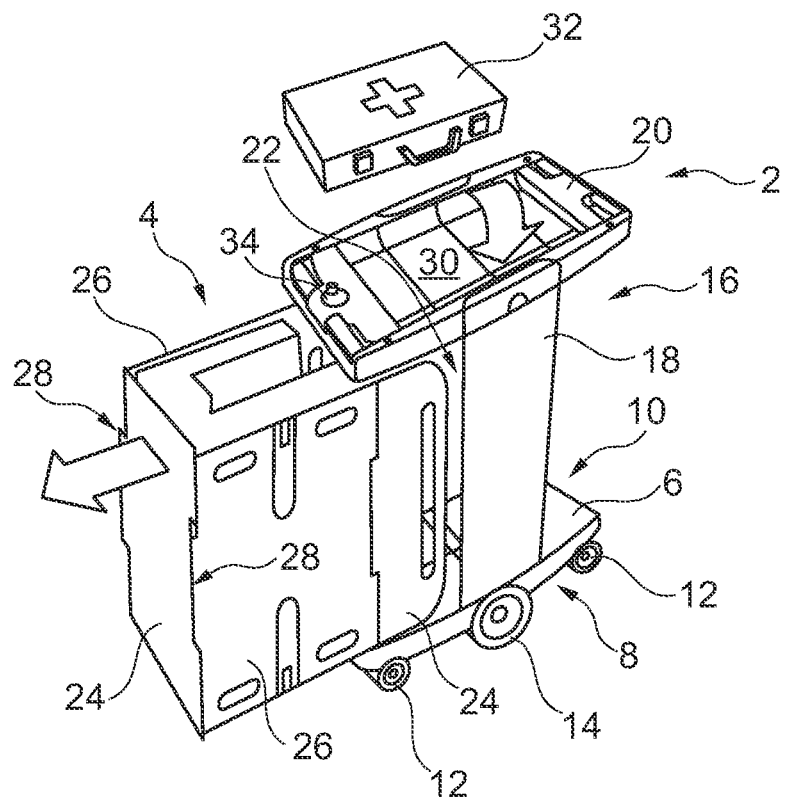
FIGS. 1 to 3 show a mobile apparatus with an integrated stretcher apparatus in various states.

FIG. 1 shows a mobile apparatus 2 with an integrated stretcher apparatus 4 for patients. The apparatus 2 has a base 6 which has a bottom side 8 and a top side 10. A plurality of wheels 12 and 14 are arranged on the bottom side 8. By way of example, centrally arranged wheels 14 are coupled to an electric drive apparatus (not illustrated in any more detail here) and are driven thereby. The base 6 can consequently be moved by means of an electric drive. However, this is merely one possible variant, and an embodiment of the apparatus 2 for manual movement would likewise be conceivable.

A frame 16 is fastened to the top side 10, said frame in this case having 2 mutually opposite walls 18 and a cover element 20. An intermediate space 22, into which the stretcher apparatus 4 can be introduced, is defined between the walls 18 and the cover element 20. Said stretcher apparatus has two first segments 24 and two second segments 26, which are connected to one another in a pivotable manner by way of hinges 28. As a result, the stretcher apparatus 4 can be brought into a first form (see, for example, FIGS. 2 and 5) and into a second form, which can be seen in FIG. 1 and in FIG. 4.

In the second form, the segments 24 and 26 have been pivoted relative to one another such that the stretcher apparatus 4 is packed down and, as a result, can be introduced into the intermediate space 22. For this purpose, the first segment 24, which is illustrated on the left in the plane of the drawing, could have for instance a width that corresponds to a width of the intermediate space 22. The width of the second segment 26, which is illustrated on the right in the plane of the drawing, corresponds substantially to the depth of the intermediate space 22. It should be noted here that the shorter dimension, visible in FIG. 1, on the top side 10 of the base 6 is denoted as the width, and the longer dimension as the depth.

The pulling of the stretcher apparatus 4 out of the intermediate space 22 in the direction of the arrow makes it possible to remove said stretcher apparatus from the frame 16, and the folding out of all of the segments 24 and 26 into a continuously flat form makes it possible to use said stretcher apparatus to carry a patient.

A recess 30 which is configured to receive an emergency kit 32 is arranged on the cover element 20, on a side facing away from the base 6. A control unit 34 is also arranged on the end side of the cover element 20, said control unit being configured, by way of example, in the form of a type of joystick, by means of which the drive apparatus of the wheels 14 can be controlled. A user can consequently move the apparatus by actuating the control unit 34.

Figure 2:
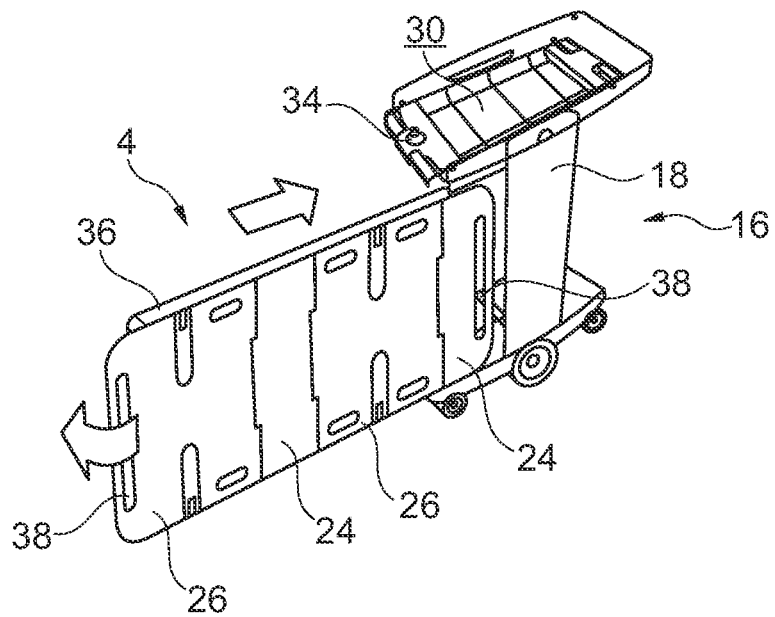

FIG. 2 shows the stretcher apparatus 4 in the first form. Here, all of the segments 24 and 26 are arranged parallel to one another and in a common plane, with the result that a continuous stretcher surface is formed. It can be seen from FIGS. 1 and 2 that a vacuum mattress 36 is also located on the stretcher apparatus 4, said vacuum mattress being able to be filled with air and particles in order to form a formable support for a patient. If the support has been correspondingly correctly formed with a patient lying thereon, for example in order to achieve a specific position of the patient, the assumed positions of the particles can be fixed by removing the air located in the vacuum mattress 36 by suction. This is particularly advantageous for enabling an unchanging supporting action for patients.

Figure 3:
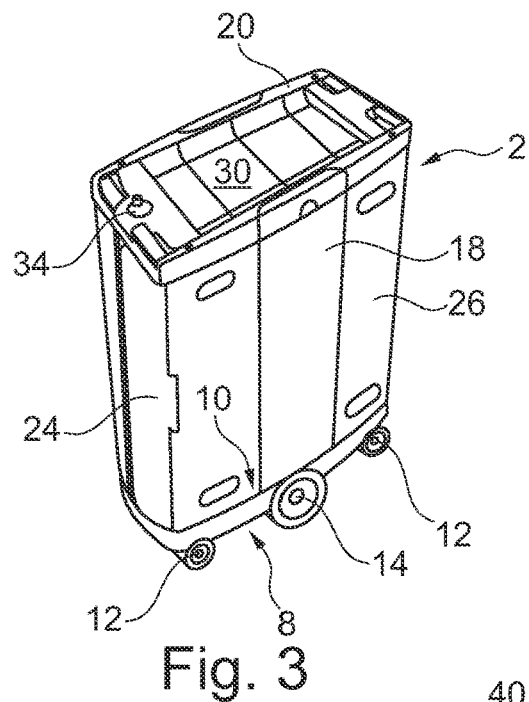

It can be seen from FIG. 3 that the segments 24 and 26 can in part provide outer surfaces of the apparatus 2. Here, the stretcher apparatus 4 has been inserted completely into the intermediate space 22, and therefore the apparatus has a form which is closed on all sides and which corresponds approximately to the form of a cabin trolley. It is particularly expedient for the apparatus 2 to be dimensioned in such a way that it can be stored in storage positions which are usually provided for cabin trolleys. By way of example, the apparatus 2 can have the same dimensions as a full-size trolley.

Figure 4:
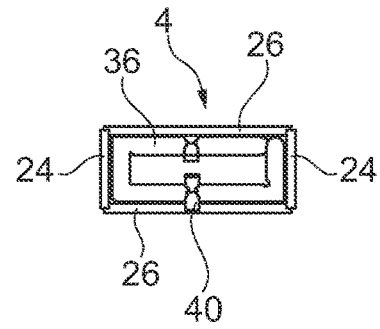
FIG. 4 shows a plan view of a packed-down stretcher apparatus.

FIG. 4 shows the stretcher apparatus 4 in the second form. The segments 24 and 26 have been folded relative to one another in such a way that the vacuum mattress 36 is positioned on the inner side of the resulting package and is completely protected by the segments 24 and 26. These moreover form the shape of a cuboid.

Figure 5:
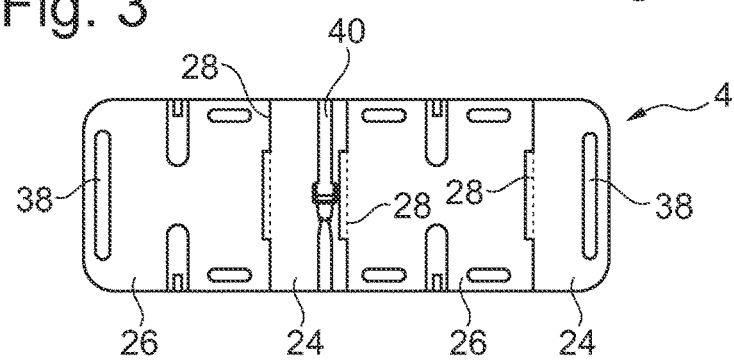
FIG. 5 shows a folded-out stretcher apparatus.

FIG. 5 shows the stretcher apparatus 4 in the first form, in which all of the segments 24 and 26 run parallel to one another and form a stretcher surface. The stretcher apparatus 4 can be handled by way of handles 38 in order to carry the patient. A belt 40 is provided for holding the patient in place.

Figure 6:
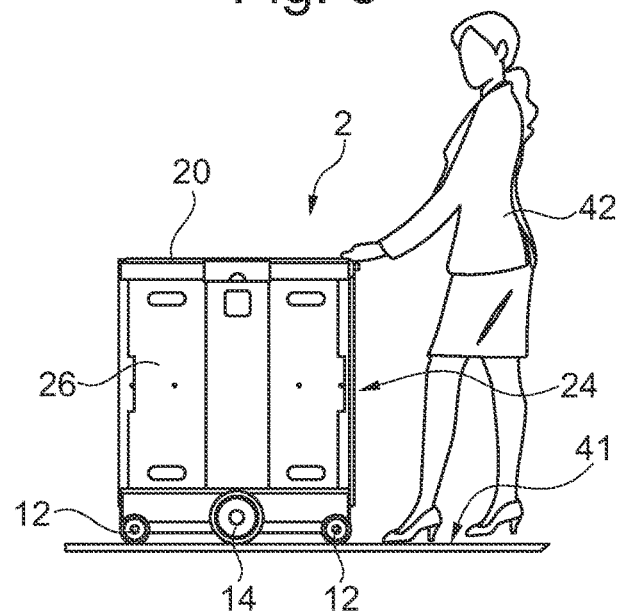
FIG. 6 shows a user moving the apparatus.

FIG. 6 shows the apparatus 2 according to the invention on a floor 41 of a cabin of a means of transport. A user 42 can move the apparatus 2 to the desired location and subsequently fold out the stretcher apparatus 4.

Figure 7:
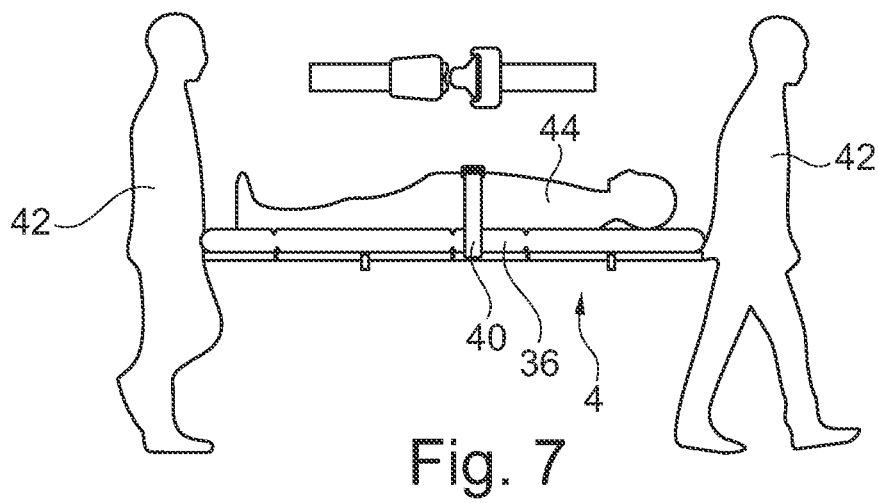
FIG. 7 shows the stretcher apparatus, carried by two users, with a patient located thereon.

In FIG. 7, a patient 44 is supported on the stretcher apparatus 4 on the vacuum mattress 36 and is carried by two users 42 by means of the handles 38.

Figure 8:
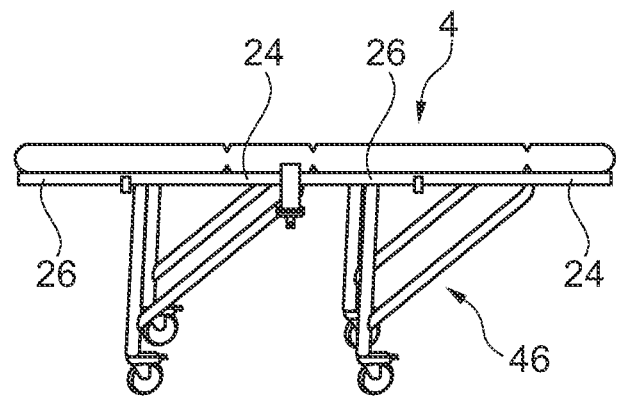
FIG. 8 shows the stretcher apparatus on a stretcher frame.

FIG. 8 schematically illustrates that the stretcher apparatus 4 can be adapted such that it can be positioned on a customary transport frame 46. If the stretcher apparatus 4 is used in an aircraft or another means of transportation, such a transport frame 46 can be positioned directly outside the means of transportation in order to subsequently receive the stretcher apparatus 4.

Figure 9:
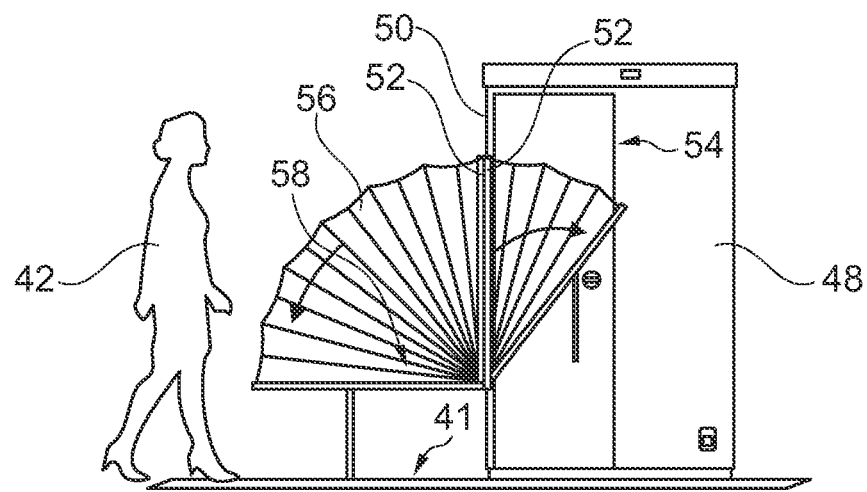
FIGS. 9 to 11 show a system for transporting patients in a lying position with a receiving apparatus integrated in a cabin monument.

A further aspect of the invention is illustrated in FIG. 9. Here, a cabin monument 48 in the form of an on-board toilet is shown. A monument wall 50 has, by way of example, two flaps 52 of a receiving apparatus 54 which are pivoted between a closed position, in which the two flaps 52 lie on one another, and an open position, in which the two flaps 52 enclose an angle of 180° with respect to one another. If the two flaps 52 have been pivoted open, they form a bearing surface 58 on which the stretcher apparatus 4 can be laid. A covering 56 can be fastened to the two flaps 52 in a manner similar to a paper lantern, and is consequently stretched over the resulting bearing surface 58 by being folded out with or after the two flaps 52.

Figure 10:
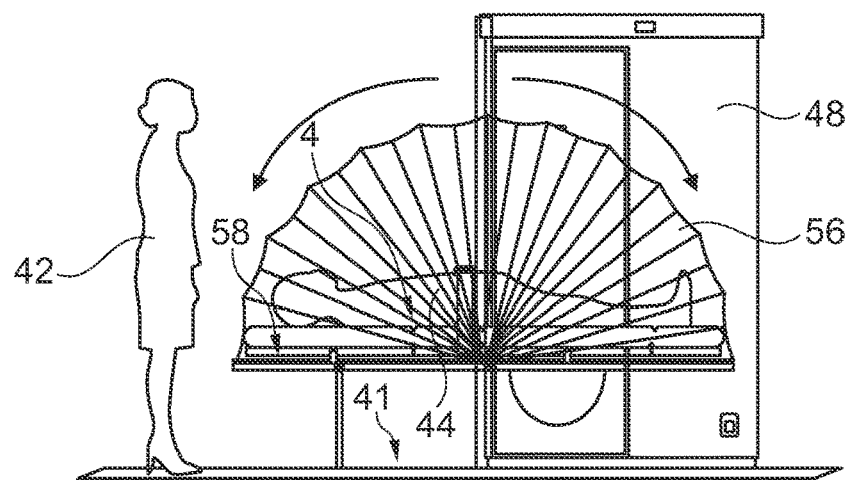

FIG. 10 shows the stretcher apparatus 4 with a patient 44 located thereon on the bearing surface 58 with a closed covering 56.

Figure 11:
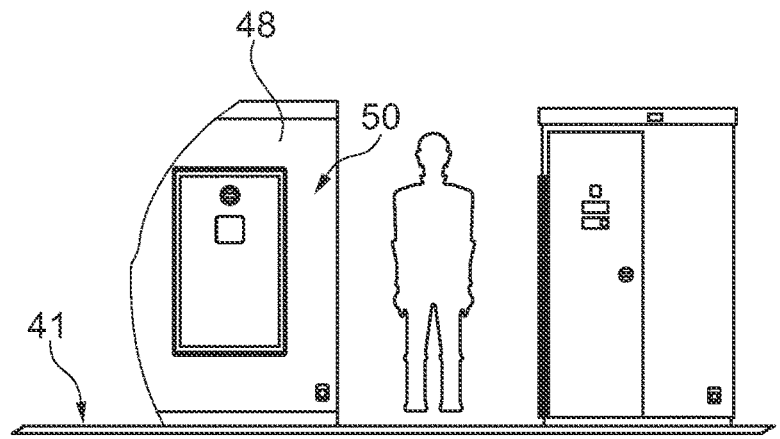

As can be seen in FIG. 11, the wall 50 can be readily integrated into any desired monument 48. In the closed state with the flaps 52 lying flush with one another, the wall 50 has the dimensions of a conventional wall.

Figure 12:
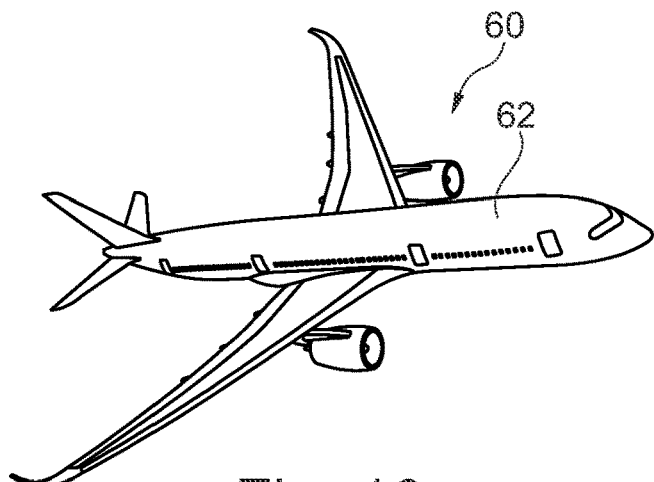
FIG. 12 shows an aircraft.

Lastly, FIG. 12 shows an aircraft 60 having a cabin 62 in which at least one receiving apparatus 54 and/or at least one apparatus 2 in accordance with the preceding description is arranged.

It is additionally pointed out that "having" or "comprising" does not rule out other elements or steps, and "a" or "an" does not rule out a multiplicity. It is also pointed out that features that have been described with reference to one of the above exemplary embodiments may also be used in combination with other features of other exemplary embodiments described above. Reference signs in the claims are not to be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

2 Mobile apparatus
4 Stretcher apparatus
6 Base
8 Bottom side
10 Top side
12 Wheel
14 Wheel (driven)
16 Frame
18 Wall
20 Cover element
22 Intermediate space
24 First segment
26 Second segment
28 Hinge
30 Recess
32 Emergency kit
34 Control unit
36 Vacuum mattress
38 Handle
40 Belt
41 Floor
42 User
44 Patient
46 Transport frame
48 Cabin monument
50 Monument wall
52 Flap
54 Receiving apparatus
56 Covering
58 Bearing surface
60 Aircraft
62 Cabin

The invention claimed is:

1. A mobile apparatus with an integrated stretcher apparatus for patients, comprising:
  a base having rotatably mounted wheels on a bottom side for moving the base on the ground,
  a frame fastened to a top side of the base and open at least on one side, and
  a stretcher apparatus having segments mounted pivotably relative to one another,
  wherein the segments are configured for folding the stretcher apparatus into a first form, in which all the segments adjoin one another in a plane, and for folding said stretcher apparatus into a second form, in which the stretcher apparatus is packed down, and
  wherein the stretcher apparatus and the frame are configured to be complementary to one another such that the stretcher apparatus in the second form is configured to be completely introduced into the frame.

2. The apparatus according to claim 1, wherein the frame has two wallsprojecting from the base and defining an intermediate space into which the stretcher apparatus is configured to be inserted in the second form.

3. The apparatus according to claim 1,
  wherein the stretcher apparatus has at least one first segment and at least two second segments, which follow one another in an alternating manner, and
  wherein at least one of the two second segments has a larger area than the at least one first segment.

4. The apparatus according to claim 3, wherein the area of the at least one of the two second segments is at least twice as large as the area of the at least one first segment.

5. The apparatus according to claim 1,
  wherein the frame has a cover element spaced apart from the base, and
  wherein the stretcher apparatus is configured to be introduced between the cover element and the base.

6. The apparatus according to claim 5, wherein the cover element has a recess for receiving an emergency kit.

7. The apparatus according to claim 1, wherein at least one of the wheels is coupled to a drive apparatus.

8. The apparatus according to claim 1, wherein outermost segments of the stretcher apparatus each have a handle.

9. The apparatus according to claim 1, wherein the stretcher apparatus has a vacuum mattress on one side.

10. The apparatus according to claim 9, wherein the vacuum mattress is on inside in the second form.

11. The apparatus according to claim 1, wherein the apparatus, with the stretcher apparatus introduced in the frame, has outer dimensions corresponding at most to dimensions of a full-size cabin trolley for aircraft cabins.

12. A system for transporting patients in a lying position in a means of transportation, comprising at least one apparatus according to claim 1.

13. The system according to claim 12,
  further comprising a receiving apparatus for receiving the transport apparatus in the first form, and
  wherein the receiving apparatus has a foldable bearing surface and a foldable covering configured to completely cover the stretcher apparatus.

14. The system according to claim 13,
  wherein the foldable bearing surface has two flaps arranged so as to be pivotable relative to one another and configured to be folded flush with one another and to be folded apart through 180°, and
  wherein the foldable covering is coupled to the two flaps, such that said covering is folded out in the manner of a concertina during the folding-apart operation and is folded up during the folding-together operation.

15. The system according to claim 12, wherein the receiving apparatus is configured to be integrated in a door or a wall of a monument in a cabin of a vehicle.

* * * * *